United States Patent
Suzuki

(10) Patent No.: US 8,571,316 B2
(45) Date of Patent: Oct. 29, 2013

(54) ELECTROPHOTOGRAPHIC APPARATUS, SYSTEM, AND METHOD OF USING COLORLESS TONER

(75) Inventor: Takeshi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 394 days.

(21) Appl. No.: 12/917,628

(22) Filed: Nov. 2, 2010

(65) Prior Publication Data

US 2011/0110590 A1    May 12, 2011

(30) Foreign Application Priority Data

Nov. 10, 2009 (JP) ................. 2009-256990
Jul. 15, 2010  (JP) ................. 2010-160612

(51) Int. Cl.
*G06K 9/34* (2006.01)

(52) U.S. Cl.
USPC .......................................... 382/173

(58) Field of Classification Search
None
See application file for complete search history.

(56) References Cited

U.S. PATENT DOCUMENTS

| | | | |
|---|---|---|---|
| 2003/0218656 A1* | 11/2003 | Yamazaki et al. | 347/43 |
| 2005/0157067 A1 | 7/2005 | Hoshino | |
| 2006/0188301 A1* | 8/2006 | Ng et al. | 399/341 |
| 2007/0211100 A1 | 9/2007 | Mizutani et al. | |
| 2008/0309959 A1* | 12/2008 | Martinez et al. | 358/1.13 |
| 2009/0195601 A1 | 8/2009 | Billow et al. | |

FOREIGN PATENT DOCUMENTS

| | | |
|---|---|---|
| CN | 101119429 A | 2/2008 |
| JP | 11-44980 | 2/1999 |
| JP | 2009-256990 | 11/2009 |
| JP | 2010-160612 | 7/2010 |

OTHER PUBLICATIONS

European search report dated Sep. 24, 2012 in corresponding European patent application No. 10251866.9.
Chinese official action dated Jan. 23, 2013 in connection with corresponding Chinese patent application No. 201010536993.6.

* cited by examiner

*Primary Examiner* — David Zarka
*Assistant Examiner* — Ryan P Potts
(74) *Attorney, Agent, or Firm* — Cooper & Dunham LLP

(57) ABSTRACT

An image processing system segments input image data into a plurality of regions, and obtains features of at least one region. The system refers to correspondence information to obtain a colorless pattern that is associated with the features of the at least one region of the input image data, and generates colorless image data using the obtained colorless pattern.

14 Claims, 13 Drawing Sheets

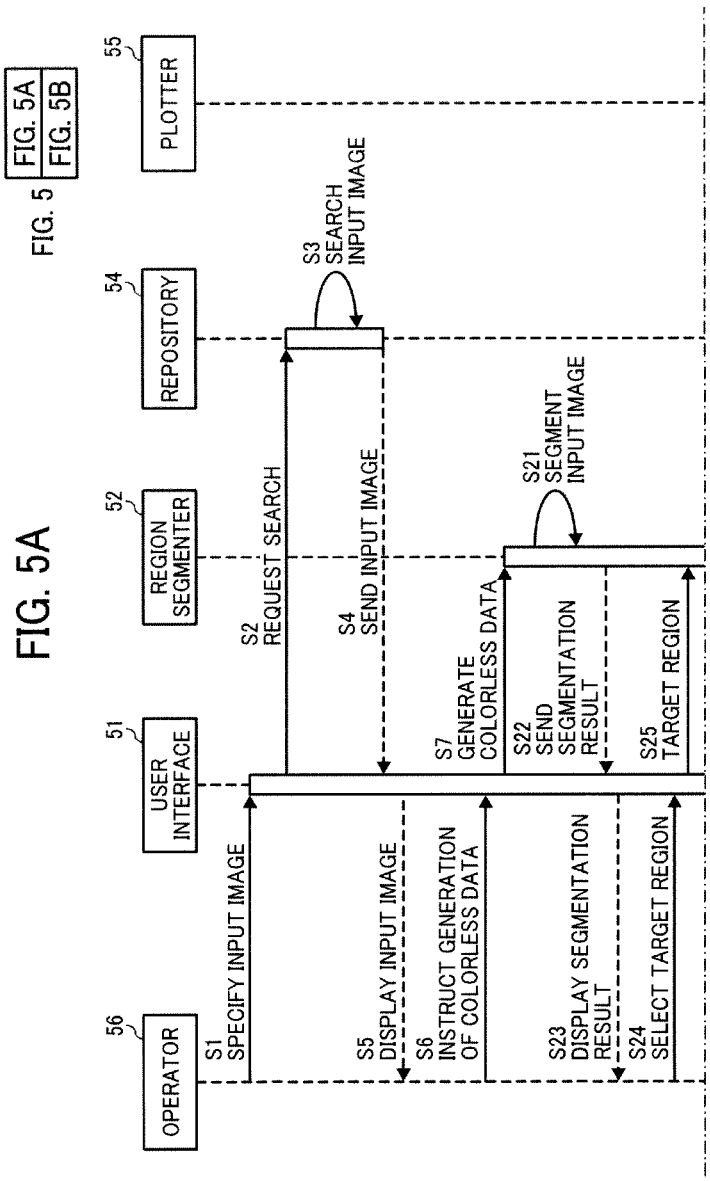

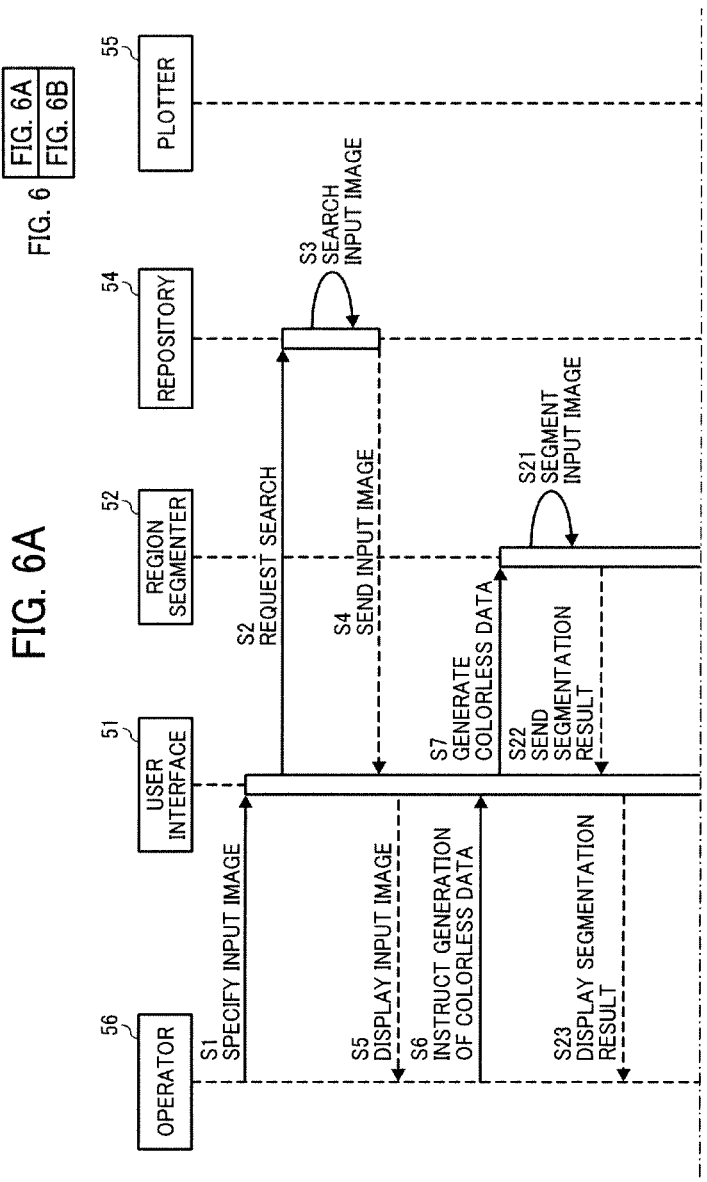

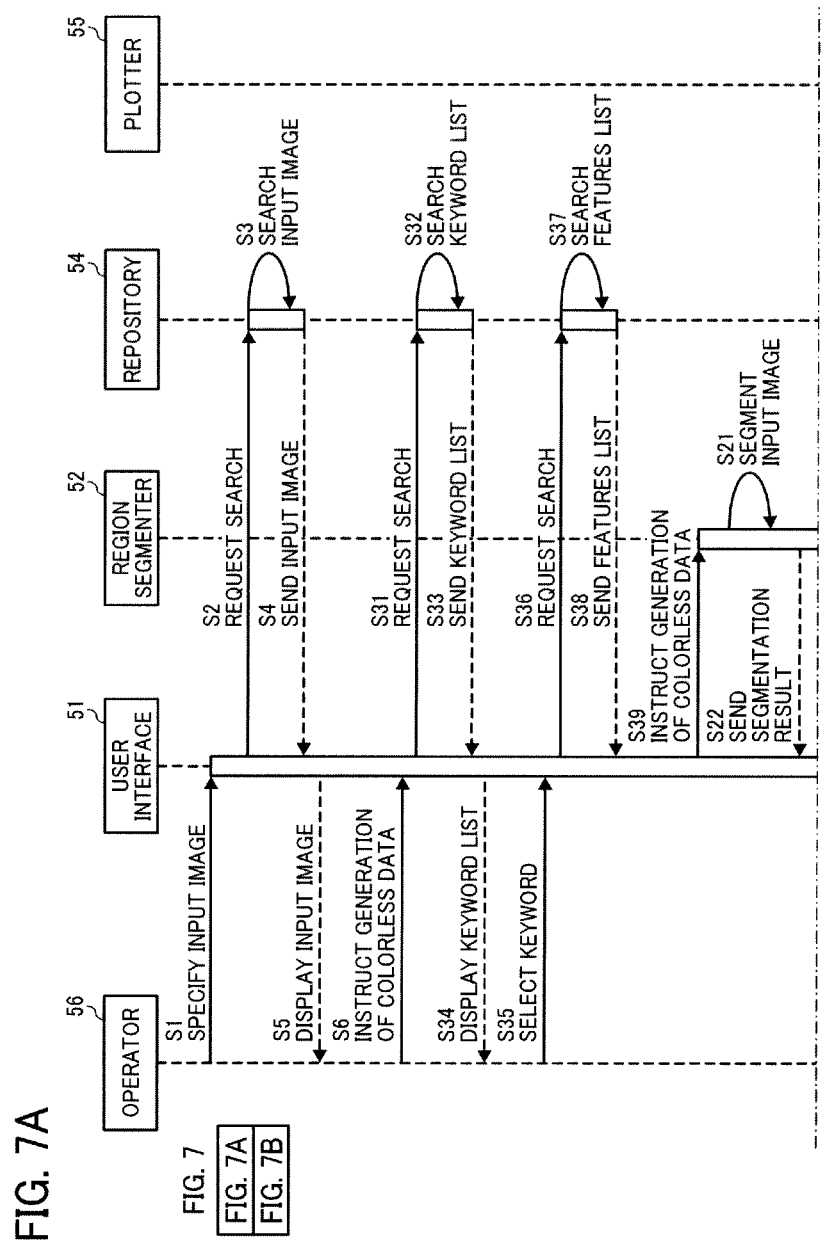

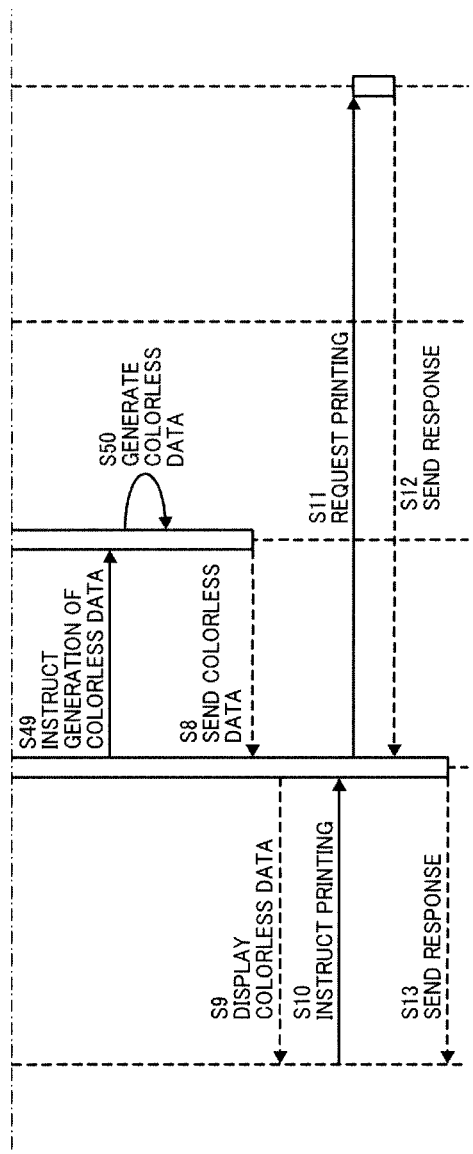

FIG. 10

| | AVERAGE BRIGHTNESS VALUE 0-100 | AVERAGE BRIGHTNESS VALUE 101-200 | AVERAGE BRIGHTNESS VALUE 201-255 |
|---|---|---|---|
| SD BRIGHTNESS VALUE 0-100 | PATTERN 11 | PATTERN 21 | PATTERN 31 |
| SD BRIGHTNESS VALUE 101-200 | PATTERN 12 | PATTERN 22 | PATTERN 32 |
| SD BRIGHTNESS VALUE 201-300 | PATTERN 13 | PATTERN 23 | PATTERN 33 |
| SD BRIGHTNESS VALUE 301-400 | PATTERN 14 | PATTERN 24 | PATTERN 34 |
| SD BRIGHTNESS VALUE 401-500 | PATTERN 15 | PATTERN 25 | PATTERN 35 |

FIG. 11

| KEYWORD LIST | FEATURES |
|---|---|
| ROUGH | INPUT IMAGE RESOLUTION REDUCTION RATIO × 3 |
| DETAILED | INPUT IMAGE RESOLUTION REDUCTION RATIO × 1 |
| ... | |

ELECTROPHOTOGRAPHIC APPARATUS, SYSTEM, AND METHOD OF USING COLORLESS TONER

CROSS-REFERENCE TO RELATED APPLICATIONS

This patent application is based on and claims priority under 35 U.S.C. §119 to Japanese Patent Application Nos. 2009-256990, filed on Nov. 10, 2009, and 2010-160612, filed on Jul. 15, 2010 in the Japanese Patent Office, the entire disclosures of which are hereby incorporated herein by reference.

FIELD OF THE INVENTION

The present invention generally relates to an apparatus, system, and method of image processing, and more specifically to an apparatus, system, and method of controlling generation of colorless image data according to information obtained from image data to be processed.

BACKGROUND

The Contemporary image forming apparatuses are provided with colorless toner or colorless ink, which are collectively referred to as "clear toner". In addition to a widely known use of clear toner to protect the printed surface or to create glossy effects, clear toner may be used to generate various colorless patterns to add visual variety to the printed image. For example, as described in Japanese Patent Application Publication Nos. 2008-532066 and 2008-145453 (JP-2008-532066-A and JP-2008-145453-A), an operator may apply any desired colorless pattern to any desired portion of the printed image.

However, it has been difficult for a general user to determine which colorless pattern should be applied to which portion of image data to be processed.

SUMMARY

In view of the above, one aspect of the present invention is to provide an apparatus, system, and method of image processing that allows a user to easily generate colorless image data that is suitable to image data to be processed.

Example embodiments of the present invention include an apparatus, method, system, computer program and product, each capable of: segmenting input image data into a plurality of regions; obtaining features of at least one region of the plurality of regions; referring to correspondence information to obtain a colorless pattern that is associated with the features of the at least one region of the input image data; and generating colorless image data using the obtained colorless pattern.

Example embodiments of the present invention include an apparatus, method, system, computer program and product, each capable of: storing keyword parameter correspondence information that associates a plurality of keywords with a plurality of segmentation parameters; allowing a user to select one of the plurality of keywords; referring to the keyword parameter correspondence information to obtain a segmentation parameter that is associated with the selected keyword; segmenting input image data into a plurality of regions using the obtained segmentation parameter; obtaining features of at least one region of the plurality of regions; referring to correspondence information to obtain a colorless pattern that is associated with the features of the at least one region of the input image data; and generating colorless image data using the obtained colorless pattern.

Example embodiments of the present invention include an apparatus, method, system, computer program and product, each capable of: storing keyword parameter correspondence information that associates a plurality of keywords with a plurality of pattern parameters used for generating a colorless pattern; allowing a user to select one of the plurality of keywords; referring to the keyword parameter correspondence information to obtain a pattern parameter that is associated with the selected keyword; segmenting input image data into a plurality of regions; obtaining features of at least one region of the plurality of regions; referring to correspondence information to obtain a colorless pattern that is associated with the features of the at least one region of the input image data and the selected pattern parameter; and generating colorless image data using the obtained colorless pattern.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10 is an example data structure of a features-colorless pattern table stored in the image processing system of FIG. 1; and FIG. 11 is an example data structure of a keyword-segmentation parameter table stored in the image processing system of FIG. 1.

Figure 1:
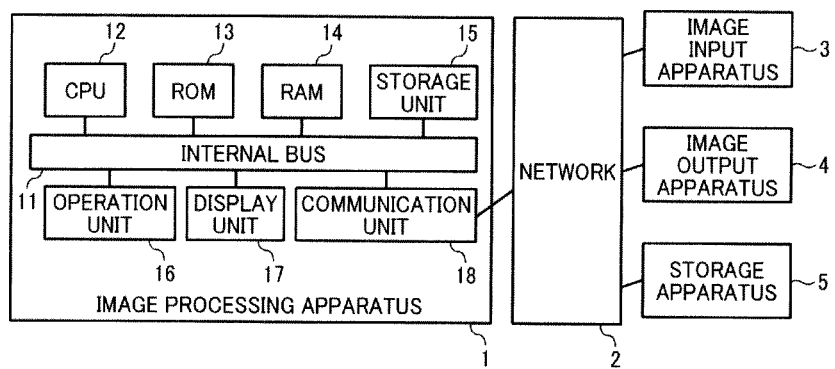
FIG. 1 is a schematic block diagram illustrating an image processing system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

<Structure of Image Processing System>

FIG. 1 illustrates an image processing system including an image processing apparatus 1, according to an example embodiment of the present invention. The image processing system of FIG. 1 includes the image processing apparatus 1, an image input apparatus 3, an image output apparatus 4, and a storage apparatus 5, which are connected through a network 2.

The image input apparatus 3 may be implemented by any desired apparatus capable of obtaining image data, such as an image scanner or a digital camera. Examples of image data include, but not limited to, picture data, drawing data, and document data. The image output apparatus 4 may be implemented by any desired apparatus capable of forming an image including, for example, a printer or a plotter that forms an image using electrophotographic method or ink jet method. The storage apparatus 5 may be implemented by a hard disk drive (HDD) capable of storing a large amount of data.

The image processing apparatus 1, which may be implemented by a computer, includes a central processing unit (CPU) 12, a read only memory (ROM) 13, a random access memory (RAM) 14, a storage unit 15, an operation unit 16, a display unit 17, and a communication unit 18, which are connected to an internal bus 11.

The CPU 12 is a processor that loads programs or data stored in a memory such as the ROM 13 or the storage unit 15 onto the RAM 14 for execution to control entire operation of the image processing apparatus 1 or operation to be performed by the image processing system of FIG. 1. The ROM 13 stores therein the program or the data for execution by the CPU 12. The RAM 14 is a memory that temporarily stores the program or data being executed by the CPU 12. The storage unit 15, which may be implemented by a HDD, stores the program or data to be used by the CPU 12 for performing various operations.

The operation unit 16 functions as a user interface, which allows a user to input user instructions to the image processing apparatus 1. The operation unit 16 may be implemented by a keyboard or a mouse. The display unit 17 functions as a user interface for allowing the image processing apparatus 1 to output information to the user, and may be implemented by a liquid crystal display (LDC) or a cathode ray tube (CRT). For example, the display unit 17 displays information input by the user through the operation unit 16 or operation status of the image processing apparatus 1. The communication unit 18 allows the image processing apparatus 1 to communicate with another apparatus through the network 2. For example, the communication unit 18 may be implemented by a network interface card. In this example, the image processing apparatus 1 communicates with any one of the image input apparatus 3, image output apparatus 4, and storage apparatus 5 through the communication unit 18.

In operation, the image processing apparatus 1 obtains image data for processing ("input image data") from the storage unit 15, the storage apparatus 5, or the image input apparatus 3. The image processing apparatus 1 deploys the input image data onto the RAM 14 to process the input image data according to a predetermined processing method. The processed image data is stored in the storage unit 15 or the storage apparatus 5. According to a user instruction, the image processing apparatus 1 sends the processed image data to the image output apparatus 4 through the network 2 to cause the image output apparatus 4 to output a printed sheet of the processed image data.

In alternative to the structure illustrated in FIG. 1, the image processing system of the present invention may be implemented in various other ways. For example, any one of the image processing apparatus 1, the image input apparatus 3, the image output apparatus 4, and the storage unit 5 may be incorporated into one apparatus to form a multifunctional apparatus (MFP). In such case, the operation unit 16 and the display unit 17 may be incorporated into one device, for example, in the form of touch screen based operation panel. For the descriptive purposes, in this specification, the image processing system of the present invention includes various forms of image processing system in addition to the image processing system illustrated in FIG. 1.

<Functional Blocks of Image Processing System>

Figure 2:
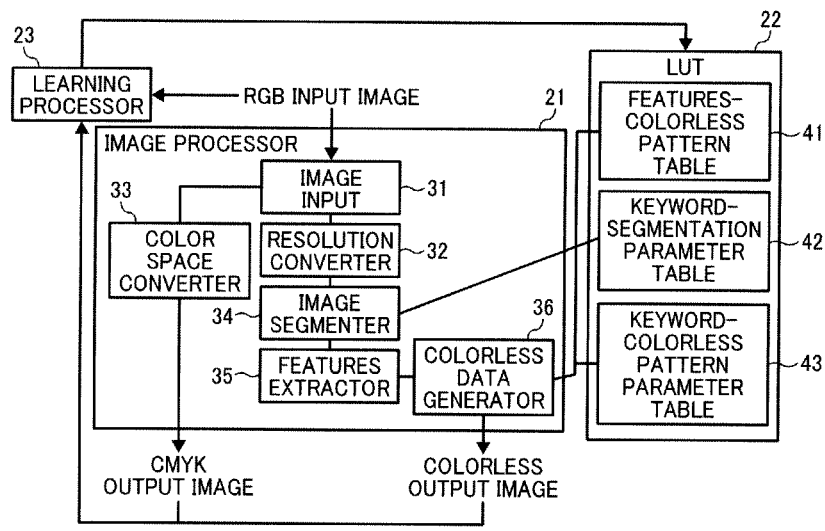
FIG. 2 is a schematic block diagram illustrating a functional structure of the image processing system of FIG. 1.

FIG. 2 illustrates a portion of a functional structure of the image processing system. Referring to FIG. 2, the image processing system includes an image processor 21, a look up table (LUT) 22, and a learning processor 23.

The image processor 21 includes an image input 31, a resolution converter 32, a color space converter 33, an image segmenter 34, a features extractor 35, and a colorless data generator 36. The LUT 22 includes a features-colorless pattern table 41, a keyword-segmentation parameter table 42, and a keyword-colorless pattern parameter table 43. The features-colorless pattern table 41 stores correspondence information that associates features that is obtained for a specific region of the input image data with a colorless pattern selected or used for the specific region. The keyword-segmentation parameter table 42 stores correspondence information that associates a plurality of keywords with a plurality of values of segmentation parameter. The keyword-colorless pattern parameter table 43 stores correspondence information that associates a plurality of keywords with a plurality of values of colorless pattern parameter. The LUT 22 may be stored in the storage unit 15 or in any other storage device such as the storage apparatus 5 of FIG. 1.

The image input 31 receives input image data in the form of RGB color image, for example, from the image input apparatus 3. The color space converter 33 converts a color space of the input image data, which is RGB, to a color space appropriate for the printer or the plotter, which is CMYK.

The resolution converter 32 applies various processing to the input image data including, for example, resolution conversion or smoothing.

The image segmenter 34 segments the image data into a plurality of regions based on the features of the input image data. For example, the image segmenter 34 segments the input image data into a character area and a picture area, or extracts an object that corresponds to a picture area from the input image data. Alternatively, the image segmenter 34 may segment the input image data according to a segmentation parameter previously set by the user through the operation unit 16. For example, when the operation unit 16 receives a user instruction including a keyword, the image segmenter 34 refers to the keyword-segmentation parameter table 42 stored in the LUT 22 to obtain a segmentation parameter that corresponds to the keyword of the user instruction, and segment the input image data into a plurality of regions according to the obtained segmentation parameter.

The features extractor 35 calculates features of one or more regions, which are segmented from the input image data.

The colorless data generator 36 generates colorless image data of the input image data. In one example, the colorless data generator 36 refers to the features-colorless pattern table 41 of the LUT 22 to obtain a colorless pattern that corresponds to the features calculated by the features extractor 35 for one or more regions of the input image data. Using the colorless pattern obtained for one or more regions, the colorless data generator 36 generates colorless image data of the input image data. The CMYK image data of the input image data output by the color space converter 33 and the colorless image data of the input image data output by the colorless data generator 36 are combined and output to the image output apparatus 4. The image output apparatus 4 outputs a printed sheet of the input image data having a colorless pattern of the colorless image data.

The learning processor 23 obtains information regarding the input image data, and information regarding the colorless image data to obtain a learned result. The learned result may be used to generate any one of the tables 41 to 43 stored in the LUT 22. The learning processor 23 may be provided in the image processing apparatus 1 or any desired apparatus on the network 2.

<Components of Image Processing System>

In this example, the image processing system is previously provided with a control program that controls operation of generating colorless image data of input image data according to features of the input image data. For example, such control program may be stored in the storage unit 15 of the image processing apparatus 1, for example, in the form of UML components illustrated in FIG. 3. Upon execution, the CPU 11 deploys the UML components of FIG. 3, which is loaded from the storage unit 15, onto the RAM 14. In alternative to storing the control program, such as the UML components of FIG. 3, in the storage unit 15, the control program may be stored in any desired memory such as the ROM 13, the storage apparatus 5, or any removable medium that may be connected to the image processing apparatus 1. Further, the image processing apparatus 1 may obtain such control program, or any part of the control program, from any other device through the network 2.

Figure 3:
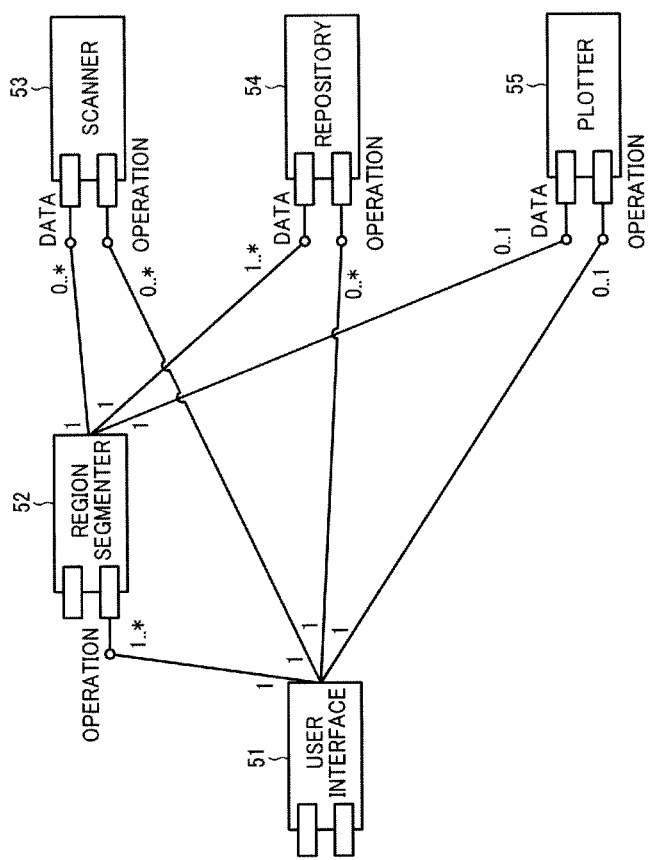
FIG. 3 is a schematic block diagram illustrating Unified Modeling Language (UML) components of the image processing system of FIG. 1.

As illustrated in FIG. 3, the UML components of the image processing system includes a user interface 51, a region segmenter 52, a scanner 53, a repository 54, and a plotter 55. The user interface 51 provides interaction with the user. The region segmenter 52 segments the input image data into a plurality of regions, and generates colorless image data of the input image data using information obtained from at least one of the regions. The scanner 53 obtains the input image data. The repository 54 stores various information such as the input image data and the colorless image data. The plotter 55 outputs the input image data and the colorless image data, for example, through printing.

Since the user interface 51 instructs the other components to perform various functions, the user interface 51 is connected to an operation board of the image processing apparatus 1. The region segmenter 52 is connected to a data port of the scanner 53 and to a data port of the repository 54 to obtain data from the scanner 53 or the repository 54. Since the image data is output through the repository 54 or the plotter 55, the region segmenter 52 is connected respectively to the repository 54 and the plotter 55 through a data port for output of the image data. The repository 54 stores therein various image data as well as the LUT 22.

<Basic Operation of UML Components>

Figure 4:
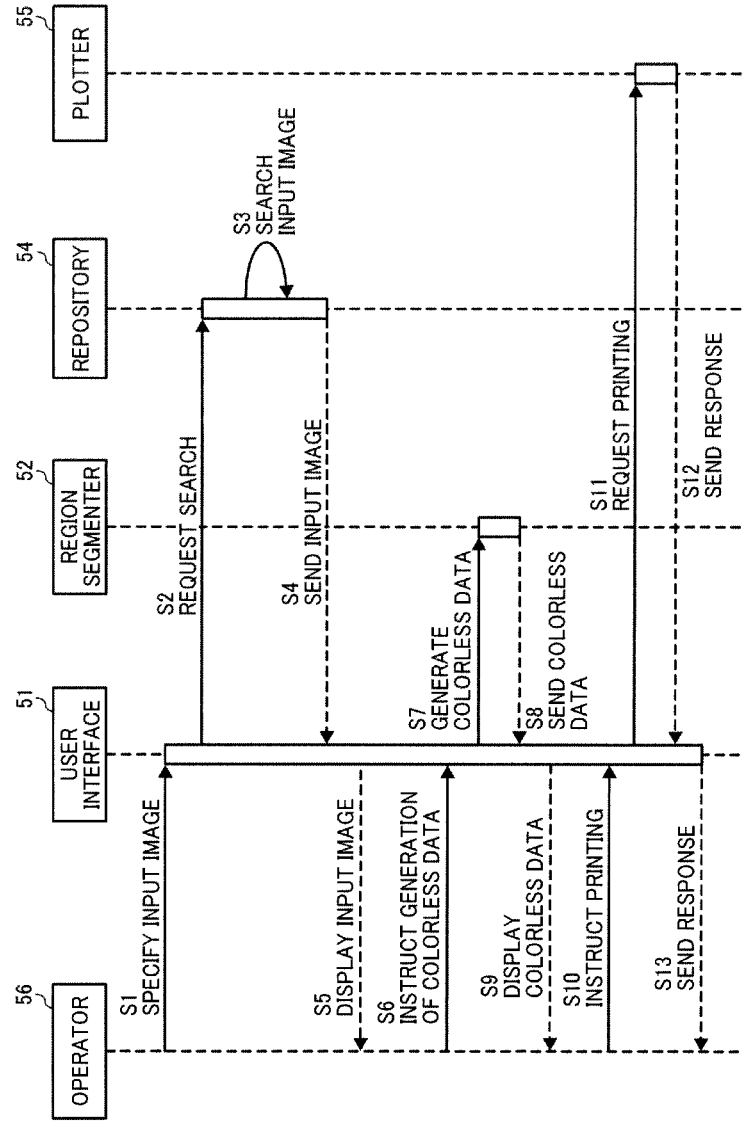
FIG. 4 is a data sequence diagram illustrating operation performed by the UML components of FIG. 3, according to an example embodiment of the present invention.

FIG. 4 illustrates a data sequence diagram illustrating operation performed by the UML components of the image processing system illustrated in FIG. 3, according to a user instruction received from an operator 56.

At S1, the operator 56 specifies input image data through the user interface 51. Assuming that the input image data has been already registered under a file system of the image processing system, S2 and S3 are performed to search for the requested image data by searching through the file system. More specifically, at S2, the user interface 51 requests the repository 54 to search for the input image data. At S3, the repository 54 searches the input image data. In this example, the repository 54 may be implemented by a storage unit such as HDD, a controller unit that manages the storage unit, a contents manager that manages contents stored in the storage unit, etc.

At S4, the input image data searched by the repository 54 in response to the request from the operator 56 is sent to the user interface 51. At S5, the user interface 51 displays the input image data for display to the operator 56, for example, through the display unit 17.

At S6, the operator 56 requests the image processing system to generate colorless image data of the specified input image data through the user interface 51.

At S7, the user interface 51 requests the region segmenter 52 to generate colorless image data of the specified input image data. At this time, the region segmenter 52 receives data regarding the input image data from the user interface 51. For example, the data regarding the input image data may be a pointer specifying a specific address of the repository 54 at which the input image data is stored. For the descriptive purpose, in this example, it is assumed that the user interface 51 stores the input image data in a memory area, and sends the input image data to the region segmenter 52.

At S8, the region segmenter 52 analyzes the input image data, generates colorless image data from the input image data based on the analysis, and sends the colorless image data to the user interface 51. In alternative to sending the colorless image data, the region segmenter 52 may store the colorless image data in the repository 54 at a specific address, and send a pointer indicating the specific address at which the colorless image data is stored to the user interface 51.

At S9, the user interface 51 displays the colorless image data for display to the operator 56, for example, using the display unit 17.

At S10, after checking the colorless image data, the operator 56 requests the image processing system to print the colorless image data and the input image data.

At S11, the user interface 51 sends the input image data and the colorless image data to the plotter 55, and instructs the plotter 55 to perform printing. In this example, the plotter 55 is a device for printing such as a plotter or a printer that is capable of printing using an electrophotographic method. The plotter 55 includes a controller that controls entire operation of the plotter, a toner container storing therein toner used by the plotter 55 for printing, a transfer device that transfer toner onto a recording sheet, a fixing device that fixes toner onto the recording sheet, a transfer device that transfers a recording sheet, etc.

When printing is completed, at S12, the plotter 55 sends notification to the user interface 51 that printing is completed. At S13, the user interface 51 notifies the operator 56 that printing is completed, and the operation ends.

As described above, the output image data is formed by printing image data that is generated by combining the colorless image data with the CMYK image data, onto the recording sheet.

The printed sheet may be further processed by a glosser, such as a printed surface processor that processes the printed sheet with high temperature and high pressure, to improve glossiness of the printed sheet. By applying high temperature and high pressure onto the printed image of the printed sheet using the glosser, the printed surface is melted and smoothened to improve smoothness throughout the surface of the printed sheet. In case of printing a watermarked image, the printed sheet does not have to be processed by the glosser as the use of clear toner may sufficiently improve glossiness of the printed sheet.

Referring to FIGS. 5 to 8, operation of the region segmenter 52 and operation of the user interface 51 are respectively explained in detail.

<Example Operation of Region Segmenter>

Figure 5B:
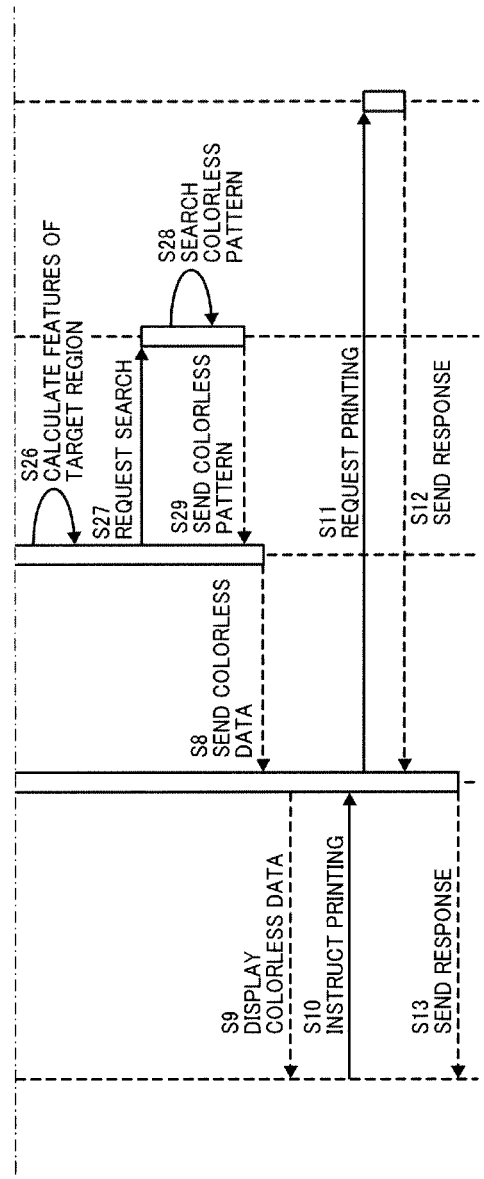
FIG. 5 is a data sequence diagram illustrating operation performed by the UML components of FIG. 3, with emphasis on example operation performed by a region segmenter.

FIG. 5 mainly illustrates example operation of generating colorless image data, performed by the region segmenter 52.

As described above referring to FIG. 4, at S7, the region segmenter 52 receives data regarding the input image data from the user interface 51, for example, together with a request for generating colorless image data.

At S21, the region segmenter 52 analyzes features of the input image data, and segments the input image data into a plurality of regions based on the features of the input image data to generate a segmentation result.

At S22, the region segmenter 52 sends the segmentation result to the user interface 51. At S23, the user interface 51 displays the segmentation result to the operator 56.

At S24, the operator 56 selects a specific region from the input image data that has been segmented into the plurality of regions as a target region through the user interface 51. At S25, the user interface 51 sends data regarding the target region to the region segmenter 52.

At S26, the region segmenter 52 calculates features of the target region. At S27, the region segmenter 52 requests the repository 54 to search a colorless pattern that corresponds to the features of the target region that is obtained through calculation. At S28, the repository 54 reads out the colorless pattern that corresponds to the features of the target region.

In this example, it is assumed that the features-colorless pattern table 41 is previously provided in the LUT 22. More specifically, the repository 54 refers to the features-colorless pattern table 41 of the LUT 22 to determine whether there is any colorless pattern that corresponds to the features of the target region. For example, the features-colorless pattern table 41 may have a data structure illustrated in FIG. 10.

In this example illustrated in FIG. 10, information regarding two types of features is stored as a set of first feature and second feature. The first feature indicates an average brightness value of a specific region of the image data, and the second feature indicates a standard deviation (SD) brightness value of the specific region of the image data. The average brightness values are classified into three classes including a class that ranges between 0 and 100, a class that ranges between 101 and 200, and a class that ranges between 201 and 255. The SD brightness values are classified into five classes including a class that ranges between 0 and 100, a class that ranges between 101 to 200, a class that ranges between 201 and 300, a class that ranges between 301 to 400, and a class that ranges between 401 to 500. Accordingly, total of 15 colorless patterns are associated respectively with different sets of average brightness value and SD brightness value. More specifically, in this example, identification information for identifying a specific pattern is associated with each one of the sets of first and second features. The colorless patterns may be stored in the storage apparatus 5 or the storage unit 15. The storage apparatus 5 or the storage unit 15 may be further provided with a look up table that stores information that associates identification information for identifying a specific pattern with a specific address at which the specific pattern is stored. Using this correspondence information, once features of a specific region of the input image data is obtained, a specific pattern that corresponds to a specific set of average brightness value and SD brightness value of the obtained features can be specified and located, for example, by using a pointer that points the specific pattern.

In this example, the set of features indicates a set of index values each indicating a specific feature of image data. In alternative to a set of average brightness value and SD brightness value, a set of average brightness value, an average hue value, and an average saturation value may be used. The index value of each feature is expressed in any numerical value equal to or greater than 1. While any combination of index values may be applied, it is preferable to previously prepare a desired combination of index values for a specific image processing type to be performed, based on empirical data or experimental data.

In case of using three or more index values as a set of features, a look up table of three or more dimensions is prepared. This is easily done by designing a layer structure of the look up table.

As described above, in this example, the image processing system automatically determines a colorless pattern that is most suitable to a region of the input image data selected by the operator. When the operator specifies a target region to which a colorless pattern is to be applied, the image processing system obtains characteristics, or features, representing the target region such as a set of the average brightness value and the SD brightness value of the target region. Based on the obtained features of the target region, the image processing system predicts the "look and feel" features of the target region, which represents impression of the operator with respect to the target region such as whether the surface image is textured or smooth. Based on the "look and feel" features of the target region, the image processing system is able to predict the effects that the operator desires to apply to the target region.

In order to predict the effects that the operator desires to apply to the target region, a system administrator previously prepares correspondence information that associates a set of features such as a set of average brightness value and SD brightness value of a specific region, with desired surface characteristics of the printed image such as unevenness or glossiness of the printed surface, based on experimental data. Further, the system administrator previously prepares correspondence information that associates the desired surface characteristics of the specific region with a colorless pattern that makes the specific region to have such desired surface characteristics.

The correspondence information may be generated based on information regarding fixing processing such as information that controls the fixing processing. Further, the correspondence information may be determined based on processing that is previously performed by the operator or determined by the system administrator. Further, the correspondence information may be made specific to each image forming engine of the image output apparatus or may be made all the same for all image forming engines. In case of generating correspondence information specific to each image forming engine, characteristics of each image forming engine used for printing may be considered, thus improving the accuracy in predicting the printed image of colorless image data. The correspondence information may be managed in the form of look up table.

In operation, when input image data is specified by the operator, the image processing system allows the operator to select a target region segmented from the input image data. The image processing system calculates features of the target region, such as the average brightness value and the SD brightness value. The image processing system further refers to the correspondence information to determine a colorless pattern that corresponds to the calculated features.

<Example of Operation of Region Segmenter>

Figure 6B:
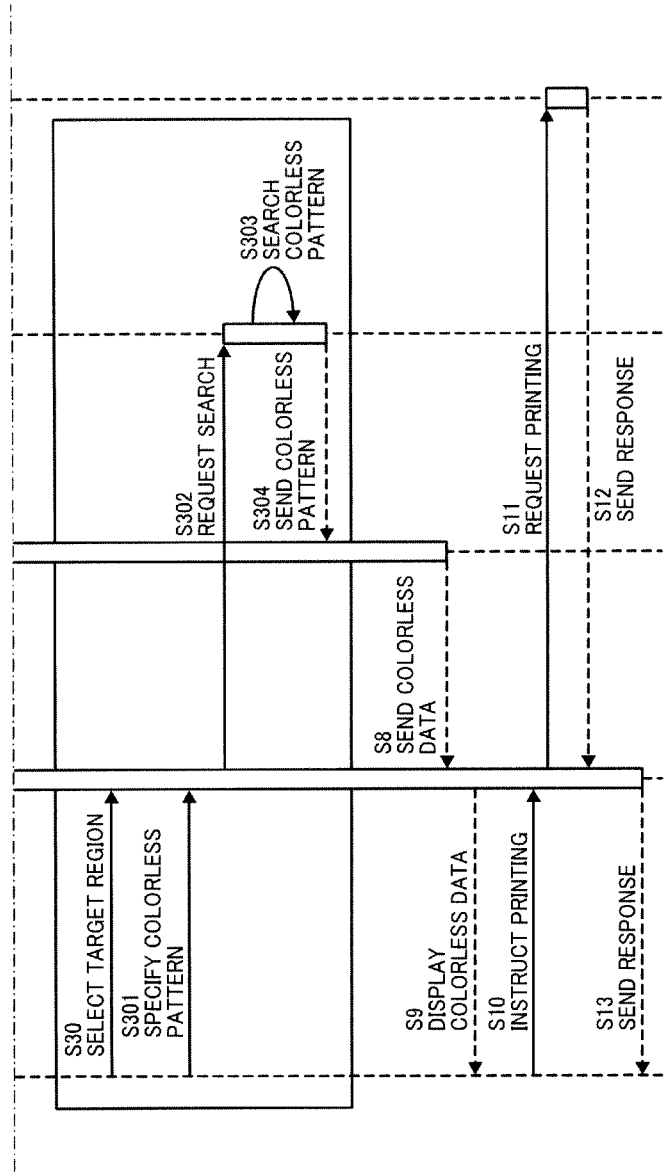
FIG. 6 is a data sequence diagram illustrating operation performed by the UML components of FIG. 3, with emphasis on example operation performed by a region segmenter.

Referring to FIG. 6, example operation of the region segmenter 52 is explained. The operation of FIG. 6 is performed in a substantially similar as described above referring to FIG. 5, except for the replacement of S24, S25, S26, S27, S28, and S29 with S30, S301, S302, S303, and S304. In this example, the image processing system causes the features-colorless pattern table 41 of the LUT 22 to store information regarding one or more colorless patterns that are selected by the operator 56 for one or more regions of input image data.

At S30, the operator 56 specifies a target region of the input image data from a plurality of regions segmented from the input image data through the user interface 51.

At S301, the operator 56 specifies a colorless pattern for the target region. In this example, the operator 56 may select a colorless pattern for the target region from one or more colorless patterns that are previously used by the image processing system. Information regarding one or more previously used colorless patterns may be stored in a memory of the image processing system. For example, when the target region is specified by the operator 56, the user interface 51 may display one or more previously used colorless patterns to the operator 56 for selection.

At S302, the user interface 51 requests the repository 54 to search the specified colorless pattern. At S303, the repository 54 searches the specified colorless pattern. At S304, the region segmenter 52 reads out the specified colorless pattern from the repository 54. At this time, the region segmenter 52 analyzes features of the target region of the input image data to obtain a set of features, and stores correspondence information that associates the specified colorless pattern with the features of the target region, for example, in the form of features-colorless pattern table 41.

When more than one region is selected at S301 the above-described steps of S302, S303, and S304 are repeated until all target regions are processed. Accordingly, a table that indicates correspondence between a set of features, which may be a set of the average brightness value and the SD brightness value, and a colorless pattern for each set of features is generated. For example, the above-described steps of S302, S303, and S304 may be performed for all regions of the input image data to create the correspondence information that associates features of all regions of the input image data with colorless patterns for all regions.

As described above, through performing the operation of FIG. 6, the region segmenter 52 obtains information regarding a colorless pattern that is specified by the operator 56 with respect to a target region of the input image data, and generates correspondence information between the specified colorless pattern and a set of the average brightness value and the SD brightness value to generate the features-colorless pattern table 41 of FIG. 10.

Alternatively, the features-colorless pattern table 41 of FIG. 10 may be generated by learning the correspondence between input image data that is previously input by an operator and a colorless pattern that has been generated based on the input image data. For example, the learning processor 23 learns the result of a plurality of colorless patterns that are manually selected by the operator for one or more of target regions using, for example, a support vector machine. The learned result is used to generate the features-colorless pattern table 41 of the LUT 22. For example, the image processing system may obtain a representative value such as an average value of features of the target region of the input image data based on the learned result. The obtained representative feature value may be used to generate the features-colorless pattern table 41 of the LUT 22.

As described above, the image processing system is able to determine a colorless pattern that is most suitable to a specific region of input image data. This would make easier for a general user to apply a colorless pattern to input image data as the system automatically determines a colorless pattern that is suitable to features of the input image data.

In alternative to automatically determining a colorless pattern based on features of the input image data, the image processing system may consider the user preference input by the operator, for example, by providing a list of keywords each relating to selection of a colorless pattern.

<Example Operation of User Interface>

Figure 7B:
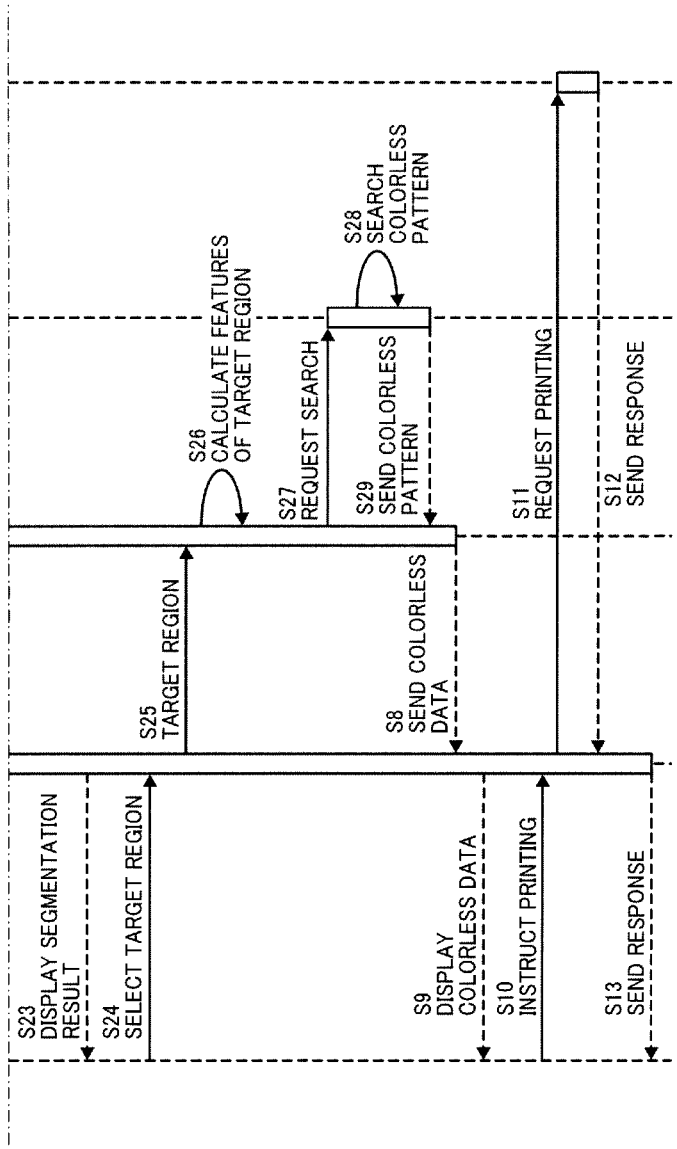
FIG. 7 is a data sequence diagram illustrating operation performed by the UML components of FIG. 3, with emphasis on example operation performed by a user interface.

FIG. 7 illustrates example operation of the user interface 51. In this example, a keyword list storing a plurality of keywords relating to a segmentation parameter is previously stored in the repository 54. The user interface 51 displays the keyword list to the user to allow the user to select a keyword. The region segmenter 52 segments the input image data into a plurality of regions according to the selected keyword.

S1 to S5 are performed in a substantially similar manner as described above referring to FIG. 4.

At S6, the operator 56 instructs the image processing system to generate colorless image data through the user interface 51. At S31, the region segmenter 52 requests the repository 54 to search for a keyword list. At S32, the repository 54 obtains the keyword list. At S33, the repository 54 sends the keyword list to the user interface 51. At S34, the user interface 51 displays the keyword list to the operator 56, for example, through the display unit 17.

At S35, the operator 56 selects a keyword from the keyword list. At S36, the user interface 51 requests the region segmenter 52 to obtain a features list that corresponds to the selected keyword. At S37, the region segmenter 52 searches through the keyword-segmentation parameter table 42 for a feature list that corresponds to the selected keyword. At S38, the region segmenter 52 sends the features list to the user interface 51.

FIG. 11 illustrates an example data structure of the keyword-segmentation parameter table 42. The keyword-segmentation parameter table 42 includes a plurality of keywords each describing the degree of segmentation of the input image data, which is collectively referred to as a keyword list. In this example, the keyword "rough" and the keyword "detailed" are stored. The keyword-segmentation parameter table 42 further includes a plurality of region segmentation parameter features, which is collectively referred to as the features list. In this example, a plurality of parameters each indicating processing of lowering resolution of the input image data that is applied before segmentation are stored including "input image lowered resolution ratio 3" and "input image lowered resolution ratio 1". In this table, one keyword corresponds to one feature. Alternatively, one keyword may correspond to a plurality of features or a list of features.

At S39, the user interface 51 sends the input image data and the features list to the region segmenter 52, and instructs the region segmenter 52 to generate colorless image data. At S21, the region segmenter 52 segments the input image data into a plurality of regions using information obtained from the features list. Specifically, in this example, the image processing system lowers resolution of the input image data as specified by a segmentation parameter of the features list obtained for the selected keyword.

S22 to S29 and S8 to S13 are performed in a substantially similar manner as described above referring to S22 to S29 of FIG. 5 and S8 to S13 of FIG. 4.

As described above referring to FIG. 7, the image processing system is provided with correspondence information that associates a plurality of keywords with a plurality of segmentation parameters. The image processing system allows an operator to select a keyword from the plurality of keywords, and segments the input image data according to a segmentation parameter that matches the selected keyword. The image processing system further determines a colorless pattern that matches features obtained from a region segmented from the input image data. Since the degree of segmentation is determined based on selection by the operator, the colorless pattern is also determined based on selection by the operator. Accordingly, the image processing system allows the operator to easily determine a colorless pattern by selecting a keyword that is more familiar to the operator.

<Example of Operation of User Interface>

Figure 8A:
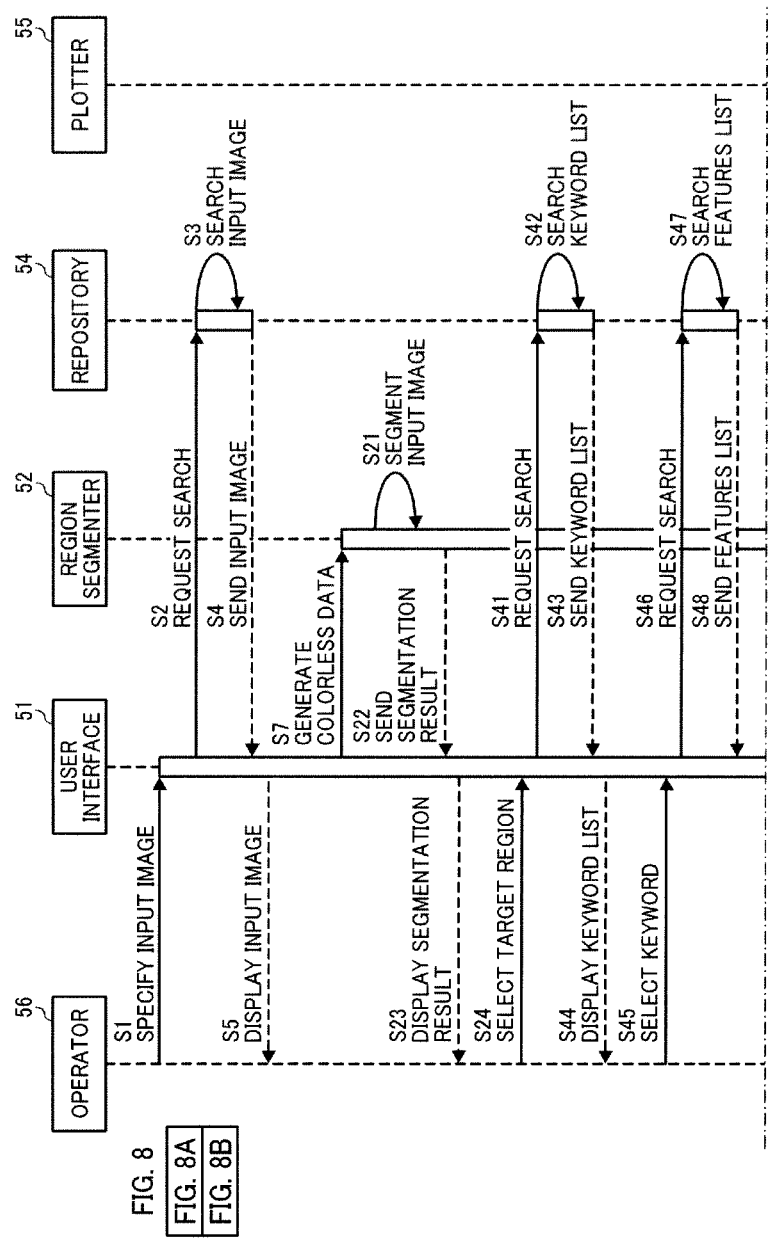
FIG. 8 is a data sequence diagram illustrating operation performed by the UML components of FIG. 3, with emphasis on example operation performed by a user interface.

FIG. 8 illustrates example operation performed by the user interface 51. In this example, a keyword list storing a plurality of keywords each describing "look and feel" features of a colorless pattern is previously stored in the repository 54. For example, the keyword list includes one or more keywords that are easily interpretable by the operator such as "textured", "smooth", "high contrast", "well-blended", "dynamic", "heavy", "transparent", "dull", and "dignity". The user interface 51 displays the keyword list, and allows the operator to select one keyword. The image processing system generates a colorless pattern having features that corresponds to the selected keyword.

Referring to FIG. 8, S1 to S23 are performed in a substantially similar manner as described above referring to FIG. 5.

At S24, the operator 56 selects a target region. At S41, the user interface 51 requests the repository 54 to search for a keyword list. At S42, the repository 54 searches a keyword list stored in the repository 54. At S43, the repository 54 sends the keyword list to the user interface 51, At S44, the use interface 51 displays the searched keyword list to the operator 56.

At S45, the operator 56 selects a keyword from the keyword list. At S46, the user interface 51 requests the repository 54 to search a features list that corresponds to the selected keyword. At S47, the repository 54 searches the keyword-colorless pattern parameter table 43 stored in the repository 54 using the selected keyword as a key. At S48, the repository 54 reads out the features list that corresponds to the selected keyword, and sends the features list to the user interface 51. In this example, the features list is previously prepared for each one of the keywords of the keyword list. The features list includes one or more index values indicating features of a colorless pattern. For example, the features list includes a set of features obtained for each colorless pattern such as a set of the index value indicating the lines contained in the colorless pattern and the index value indicating the frequency of the lines, and a set of the index value indicating the dots contained in the colorless pattern and the index value indicating the ratio of the dots.

At S49, the user interface 51 sends the features list to the region segmenter 52, and instructs the region segmenter 52 to generate colorless image data using the features list. At S50, the region segmenter 52 generates colorless image data based on the features list. More specifically, the region segmenter 52 generates colorless image data using a colorless pattern having features specified by the obtained features list. For example, each one of the features list may be associated with each one of the colorless patterns that are stored in the image processing system.

S8 to S13 are performed in a substantially similar manner as described above referring to S8 to S13 of FIG. 4.

As described above referring to FIG. 8, the image processing system is provided with correspondence information that associates a plurality of keywords with a plurality of features of colorless pattern. The image processing system allows an operator to select a keyword from the plurality of keywords, and selects a colorless pattern having features that matches the selected keyword. Accordingly, the image processing system allows the operator to easily determine a colorless pattern by selecting a keyword that is more familiar to the operator.

In any one of the above-described examples, it is assumed that the operator 56 outputs the colorless image data being displayed by the user interface 51. Alternatively, the operator 56 may modify the colorless image data being displayed before instructing output of the colorless image data. In such case, the user interface 51 may request the repository 54 to store modified colorless image data.

In any one of the above-described examples, the image processing system determines a colorless pattern based on features of the input image data. In addition to the features of the input image data, the image processing system may consider any other desired characteristics that may influence the appearance of printed image.

For example, in the electrophotographic printing process, toner that is transferred onto a recording sheet is fixed by heat and pressure. For this reason, an amount of toner that can be adhered onto the recording sheet, which is known as the pile height of toner, is restricted. When superimposing the colorless image onto the CMYK image, for example, in order to create a three-dimensional image, the pile height needs to be considered. In another example, the appearance of colorless pattern being printed may differ depending on type of paper such as paper thickness or paper characteristics.

Figure 9:
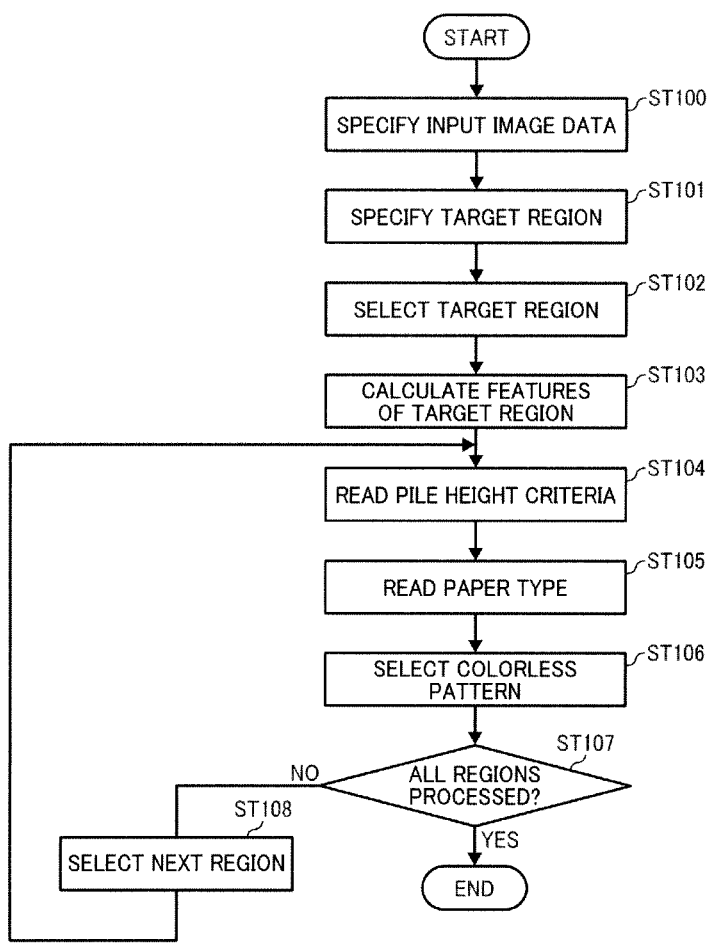
FIG. 9 is a flowchart illustrating example operation of generating a colorless pattern, performed by the image processing system of FIG. 1.

FIG. 9 is a flowchart illustrating operation of generating colorless image data, performed by the image processing system, according to an example embodiment of the present invention. The operation of FIG. 9 may be performed by the UML components of FIG. 3. The operation of FIG. 9 is substantially similar to the operation of FIG. 5, except that a colorless pattern is determined based on pile height criteria information and paper type information, in addition to features of the input image data.

At ST100, the image processing system receives information regarding input image data specified by the operator 56 in a substantially similar manner as described above referring to S1 of FIG. 5.

At ST101, the image processing system receives information regarding a target region specified by the operator 56 in a substantially similar manner as described above referring to S25 of FIG. 5. In this example, it is assumed that the operator 56 specifies more than one region of the input image data as the target region.

At ST102, the image processing system selects one of the target regions as a selected target region for processing.

At ST103, the image processing system calculates features of the selected target region in a substantially similar manner as described above referring to S26 of FIG. 5.

At ST104, the image processing system reads information regarding pile height criteria of the selected target region, from the repository 54. At ST105, the image processing system reads information regarding paper type information from the repository 54. In this example, the repository 54 previously stores information regarding pile height criteria and information regarding paper type information.

At ST106, the image processing system determines a colorless pattern of the selected target region based on the features of the selected target region, the pile height criteria information, and the paper type information.

At ST107, the image processing system determines whether all target regions are processed. When it is determined that all target regions are processed ("YES" at ST107), the operation ends. When it is determined that all target regions are not processed ("NO" at ST107), the operation proceeds to ST108 to select a next target region for further processing.

ST106 are performed in a substantially similar manner as described above referring to S27 to S29 of FIG. 5, except that the colorless pattern is determined using additional information. More specifically, at S27 to S29 of FIG. 5, the image processing system searches the features-colorless pattern table 41 stored in the repository 54 for a colorless pattern that corresponds to the features of the target region. At ST106, the image processing system obtains a colorless pattern that corresponds to the features, pile height criteria information, and paper type information, respectively obtained for the target region.

In this example, a features-pile height-paper type-colorless pattern table may be stored in the LUT 22. For example, the features-colorless pattern tables 41 may be prepared respectively for a plurality of pile height criteria and a plurality of paper types. By selecting one of the features-colorless pattern tables 41 using the pile height criteria information and the paper type information, the image processing system is able to select a colorless pattern that is suitable to the input image data while considering pile height and paper type in addition to features of the input image data.

For pile height criteria information, one or more index values selected from an index value indicating a nip width of a fixing roller of a fixing device of the image output apparatus 4, an index value indicating a fixing temperature of the fixing device, and type of toner to be used by the image output apparatus 4. With these types of information, the maximum value of pile height that is allowed for clear toner can be estimated, thus predicting the maximum height of a colorless pattern that is available for use.

For paper type information, one or more index values selected from an index value indicating the weight of paper to be processed, whiteness of paper, glossiness of paper, and surface smoothness of paper may be used. With these types of information indicating thickness of paper or surface characteristics of paper, the appearance of colorless pattern when it is printed can be predicted.

In the above-described example referring to FIG. 9, the image processing system may only use one of the pile height criteria information and the paper type information, in addition to the features of input image data.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in an image processing apparatus that segments input image data into a plurality of regions, extracts features of each region of the input image data, and determines a colorless pattern that is suitable to each region based on the features.

For example, the image processing apparatus is previously provided with a look up table that indicates the correspondence between a features space defined by a set of one or more types of features and a colorless pattern. Once a set of features is obtained for each region, the image processing apparatus refers to the look up table to obtain the colorless pattern that corresponds to the set of features of each region.

In order to generate the look up table, two or more sets of features of input image data and a colorless pattern, that are respectively obtained for previously processed image data, may be input to a learning processor to learn the correspondence between a set of features and a colorless pattern. Based on the learned result, the look up table is generated. The learning processor may be implemented by a support vector machine.

As described above, the image processing apparatus is able to suggest a colorless pattern that is suitable to input image data based on features of the input image data for display to the operator.

Further, the image processing apparatus may be additionally provided with a list of keywords to assist a user in determining a type of colorless pattern that is available for use. By allowing the user to select a keyword from the keyword list, the image processing apparatus is able to generate a colorless pattern that matches the selected keyword.

In one example, the image processing apparatus may be provided with a keyword list including a plurality of keywords each relating to a segmentation parameter used for segmenting the input image data into a plurality of regions. For example, the keyword list may include one or more keywords each indicating the degree of segmentation such as the keyword "rough" and the keyword "detailed". For the segmentation parameter, a parameter specifying resolution lowering processing applied before segmentation processing may be used The keywords in the keyword list are associated with the segmentation parameters to generate a look up table.

In another example, the image processing apparatus may be provided with a keyword list including a plurality of keywords each relating to a colorless pattern to be applied to a region of the input image data. For example, the keyword list may include one or more keywords each describing the "look and feel" features of a colorless pattern such as the keyword "smooth", the keyword "moist", and the keyword "high contrast". The keyword list may be previously prepared by a system administrator or learned by the image processing system based on empirical data. The keywords of the keyword list are associated with colorless patterns to generate correspondence information between a keyword and a colorless pattern. The correspondence information may be previously prepared by the system administrator or learned by the image processing system, for example, based on correspondence information obtained from previously input image data and a colorless pattern that is selected for the previously input image data.

In one example, the present invention may reside in an image processing apparatus including: a region segmenter configured to segment input image data into plurality of regions according to characteristics of the input image data; a features extractor configured to obtain features of at least one of the plurality of regions segmented from the input image data; a look up table configured to store correspondence information that associates features of a region and a colorless pattern; and a colorless data generator configured to refer to the look-up table to determine a colorless pattern that corresponds to the features obtained by the features extractor and to generate colorless image data using the colorless pattern.

In one example, the look-up table includes information regarding one or more colorless patterns that are used for previously input image data.

In one example, the look-up table includes information obtained by learning correspondence between a region of previously input image data and a colorless pattern that is applied to the region.

In one example, the image processing apparatus further includes: a look up table to store correspondence information that associates a previously determined keyword list with a region segmentation parameter; and means for displaying the keyword list to the user. The region segmenter segments the input image data into a plurality of regions using the region segmentation parameter that is associated with a keyword selected from the keyword list by the user.

In one example, the image processing apparatus further includes: a look up table to store correspondence information that associates a previously determined keyword list with a parameter for generating a colorless pattern; and means for displaying the keyword list to the user. The colorless data generator generates the colorless pattern of the input image data using a colorless pattern generation parameter that is associated with a keyword selected from the keyword list by the user.

In one example, the look up table further stores correspondence information that associates previously determined image features and pile height criteria information of a fixing process of electrophotographic image forming with a colorless pattern. The colorless data generator refers to the look up table to obtain a colorless pattern that corresponds to the features obtained by the features extractor and the pile height criteria information, and generates the colorless image data using the obtained colorless pattern.

In one example, the correspondence information stored in the look up table indicates that correspondence among the previously determined image features, the pile height criteria information of a fixing process of eletrophotographic image forming, the colorless pattern, and paper type information of paper to which an image is formed by the electrophotograhpic image forming. The colorless data generator refers to the look up table to obtain a colorless pattern that is associated with the features extracted by the features extractor, the pile height criteria information, and the paper type information, and generates the colorless image data using the colorless pattern.

In one example, the pile height criteria information includes at least one of a nip width of a fixing device, a fixing temperature of the fixing device, and a type of toner to be applied to generate an image of the colorless image data.

In one example, the paper type information includes at least one of paper weight information, glossiness information, whiteness information, and surface smoothness information.

In one example, the image processing apparatus further includes a region selector configured to select the target region from the plurality of regions segmented from the input image data according to a user instruction, wherein the features extractor is configured to extract the features only from the target region selected by the region selector.

In one example, the features of the target region includes an average brightness value and a standard deviation brightness value.

In one example, the present invention may reside in an image processing system including: a region segmenter configured to segment input image data into a plurality of regions according to characteristics of the input image data; a features extractor configured to obtain features of at least one of the plurality of regions segmented from the input image data; a look up table configured to store correspondence information that associates features of a region and a colorless pattern; and a colorless data generator configured to refer to the look-up table to determine a colorless pattern that corresponds to the features obtained by the features extractor and to generate colorless image data using the colorless pattern.

In one example, the present invention may reside in an image processing method including: segmenting input image data into a plurality of regions according to characteristics of the input image data; obtaining features of at least one of the plurality of regions segmented from the input image data; storing correspondence information that associates features of a region and a colorless pattern; and referring to the look-up table to determine a colorless pattern that corresponds to the obtained features to generate colorless image data using the colorless pattern.

In one example, the present invention may reside in a recording medium storing a plurality of instructions which cause a processor to perform the above-described image processing method.

What is claimed is:

1. An image processing system for image forming with an electrophotographic image forming device, comprising:
   a memory that stores correspondence information associating features of a region of image data with a colorless pattern to be formed with colorless toner in electrophotographic image forming, the correspondence information including pile height criteria information restricting a pile height of the colorless toner in association with a set of the features and the colorless pattern; and
   a processor configured by execution of a program of instructions to include:
     an image segmenter part that segments input image data into a plurality of regions;
     a features extractor part that obtains features of at least one of the plurality of regions segmented from the input image data; and
     a colorless data generator part that determines a specific colorless pattern based on the correspondence information and the pile height criteria information that corresponds to the features obtained for the at least one of the plurality of regions of the input image data, and generates colorless image data using the colorless pattern, for controlling electrophotographic image forming using the colorless toner, wherein the memory stores keyword parameter correspondence information that associates a plurality of keywords each reflecting features of a colorless pattern with a plurality of pattern parameters each specifying the features of the colorless pattern, the processor configured by execution of the program of instructions causes a user interface to display a list of the plurality of keyword to a user to allow the user to select one of the plurality of keywords, and the processor is further configured by execution of the program of instructions to include a region segmentor part that refers to the keyword parameter correspondence information to obtain a pattern parameter that corresponds to the selected keyword, and generates the colorless pattern using the obtain pattern parameter.

2. The image processing system of claim 1, wherein the processor configured by execution of the program of instructions generates the correspondence information based on one or more colorless patterns that are applied to input image data previously input to the image processing system.

3. The image processing system of claim 1, further comprising:

a learning processor configured to learn correspondence between a region of input image data previously input to the image processing system and a colorless pattern that is applied to the region of the previously input image data to generate a learned result, wherein the processor configured by execution of the program of instructions generates the correspondence information based on the learned result obtained by the learning processor.

4. The image processing system of claim 1, wherein:

the memory stores paper type information of paper onto which the image of the colorless image data is transferred in association with a set of the features, the colorless pattern, and the pile height criteria information, and the processor configured by execution of the program of instructions determines the colorless pattern based on the paper type information that corresponds to the features obtained for the at least one of the plurality of regions of the input image data and the pile height criteria information.

5. The image processing system of claim 1, wherein the pile height criteria information includes at least one of a nip width of a fixing device of the electrophotographic image forming device, a fixing temperature of the fixing device of the electrophotographic image forming device, and a type of toner to be applied to generate the electrophotographic image based on the colorless image data.

6. The image processing system of claim 1, wherein:

the processor configured by execution of the program of instructions causes a user interface to allow a user to select one of the plurality of regions segmented from the input image data as the at least one of the plurality of regions.

7. The image processing system of claim 1, wherein the features of the region of the correspondence information includes an average brightness value and a standard deviation brightness value respectively obtained for the region.

8. The image processing system of claim 1, wherein the pile height criteria information includes a type of toner to be applied to generate the electrophotographic image based on the colorless image data.

9. The image processing system of claim 1, wherein the pile height criteria information includes an index value indicating a nip width of a fixing device of the electrophotographic image forming device.

10. The image processing system of claim 1, wherein the pile height criteria information includes an index value indicating a fixing temperature of a fixing device of the electrophotographic image forming device.

11. The image processing apparatus of claim 4, wherein the paper type information includes at least one of paper weight information, glossiness information, whiteness information, and surface smoothness information.

12. An image processing system for image forming with an electrophotographic image forming device, comprising:

a memory that stores correspondence information associating features of a region of image data with a colorless pattern to be formed with colorless toner in electrophotographic image forming, the correspondence information including pile height criteria information restricting a pile height of the colorless toner in association with a set of the features and the colorless pattern; and a processor configured by execution of a program of instructions to include:

an image segmenter part that segments input image data into a plurality of regions;

a features extractor part that obtains features of at least one of the plurality of regions segmented from the input image data; and a colorless data generator part that determines a specific colorless pattern based on the correspondence information and the pile height criteria information that corresponds to the features obtained for the at least one of the plurality of regions of the input image data, and generates colorless image data using the colorless pattern, for controlling electrophotographic image forming using the colorless toner, wherein:

the memory stores keyword parameter correspondence information that associates a plurality of keywords each reflecting the degree of segmentation of the input image data with a plurality of segmentation parameters each specifying the degree of segmentation, the processor configured by execution of the of the program of instructions causes a user interface to display a list of the plurality of keyword to a user to allow the user to select one of the plurality of keywords, and the processor is further configured by execution of the program of instructions to include a region segmentor part that refers to the keyword parameters correspondence information to obtain a segmentation parameter that corresponds to the selected keyword, and segments the colorless pattern using the obtain pattern parameter.

13. An image processing apparatus for image forming with an electrophotographic image forming device, comprising:

a table configured to store correspondence information associating features of a region of image data with a colorless pattern to be formed with colorless toner in electrophotographic image forming, the correspondence information including pile height criteria information restricting a pile height of the colorless toner in association with a set of the features and the colorless pattern;

a region segmenter configured to segment input image data into a plurality of regions;

a memory that stores keyword parameter correspondence information that associates a plurality of keywords each reflecting the degree of segmentation of the input image data with a plurality of segmentation parameters each specifying the degree of segmentation;

a user interface configured to display a list of the plurality of keyword to a user to allow the user to select one of the plurality of keywords, wherein the regions segmentor refers to the keyword the keyword parameter correspondence information to obtain a segmentation parameter that corresponds to the selected keyword, and segments the colorless pattern using the obtain pattern parameter;

a features extractor configured to obtain features of at least one of the plurality of regions segmented from the input image data; and a colorless data generator configured to refer to the table to obtain a specific colorless pattern based on the correspondence information and the pile height criteria information that corresponds to the features obtained for the at least one of the plurality of regions of the input image data and to generate colorless image data using the colorless pattern, for controlling electrophotographic image forming using the colorless toner.

14. A non-transitory recording medium storing a plurality of instructions which cause a processor to perform an image processing method for image forming with an electrophotographic image forming device, the comprising:

storing correspondence information that associates features of a region of image data with a colorless pattern to be formed with colorless toner in electrophotographic image forming, the correspondence information including pile height criteria information restricting a pile height of the colorless toner in association with a set of the features and the colorless pattern;

displaying a list of a plurality of keywords to a user to allow the user to select one of the plurality of keywords, wherein the correspondence information includes keyword parameter correspondence information that associates the plurality of keywords each reflecting a degree of segmentation of the input image data with a plurality of segmentation parameters each specifying the degree of segmentation;

segmenting input image data into a plurality of regions using the obtained segmentation parameter;

obtaining features of at least one of the plurality of regions segmented from the input image data;

determining a specific colorless pattern based on the correspondence information and the pile height criteria information to obtain a colorless pattern that corresponds to the features obtained for the at least one of the plurality of regions of the input image data; and generating colorless image data using the colorless pattern, for controlling electrophotographic image forming using the colorless toner.

* * * * *